United States Patent [19]

Greffioz et al.

[11] Patent Number: 5,074,948
[45] Date of Patent: Dec. 24, 1991

[54] LAY-UP DEVICE FOR AUTOMATIC POSITIONING OF A WEB OF FIBERS ON A MOLD

[75] Inventors: André Greffioz, Lasternes Capdenac-Le-Haut; Pierre Tillement, Decazeville, both of France

[73] Assignee: Brisard Machines Outils, Capdenac, France

[21] Appl. No.: 477,901

[22] PCT Filed: Aug. 23, 1989

[86] PCT No.: PCT/FR89/00426

§ 371 Date: Apr. 26, 1990

§ 102(e) Date: Apr. 26, 1990

[30] Foreign Application Priority Data

Aug. 26, 1988 [FR] France .................. 88 11244

[51] Int. Cl.$^5$ .......................................... B32B 31/00
[52] U.S. Cl. .................... 156/361; 156/433; 156/523; 156/574
[58] Field of Search ............ 156/361, 574, 523, 433, 156/441; 29/116.1, 121.1, 130, 132

[56] References Cited

U.S. PATENT DOCUMENTS

| | | | |
|---|---|---|---|
| 3,774,040 | 4/1971 | Chitwood et al. | 156/522 |
| 3,775,219 | 11/1973 | Karlson et al. | 156/523 X |
| 4,461,669 | 7/1984 | Dontscheff | 156/574 X |
| 4,588,466 | 5/1986 | Eaton | 156/361 X |
| 4,591,402 | 5/1986 | Evans | 156/523 X |
| 4,750,965 | 6/1988 | Pippel et al. | 156/574 X |
| 4,997,510 | 3/1991 | Shinno et al. | 156/523 X |

FOREIGN PATENT DOCUMENTS

| | | |
|---|---|---|
| 0204249 | 12/1986 | European Pat. Off. . |
| 0250673 | 1/1988 | European Pat. Off. . |
| 0255425 | 2/1988 | European Pat. Off. . |
| 3117608 | 11/1982 | Fed. Rep. of Germany . |
| 2507959 | 12/1982 | France . |
| 2529871 | 1/1984 | France . |
| 8400351 | 2/1984 | PCT Int'l. Appl. . |

Primary Examiner—Michael W. Ball
Assistant Examiner—Jeff H. Aftergut
Attorney, Agent, or Firm—Burgess, Ryan & Wayne

[57] ABSTRACT

This lay-up device for automatic positioning of a web of fibers on a mold comprises a lay-up head adapted to move under the control of a numerical control unit, in translation along three axes X, Y, Z and in rotation about the vertical axis Z as well as about a horizontal axis oriented in the direction of feed motion of the machine; the lay-up head (2) carries a roller (10) for applying the web of fibers (4) to be deposited on the surface (6) to be covered; the roller (10) is mounted on a support (18) connected to the head (2) by means of an articulation (20) about a horizontal axis of rotation X' which extends substantially in the direction of feed motion of the machine; this articulation, which is deformable without play (20) and has very slight flexibility, is constituted by a full portion reserved between two slits (22–22') formed between the main support (16) and the auxiliary support (18) of the head (2).

9 Claims, 3 Drawing Sheets

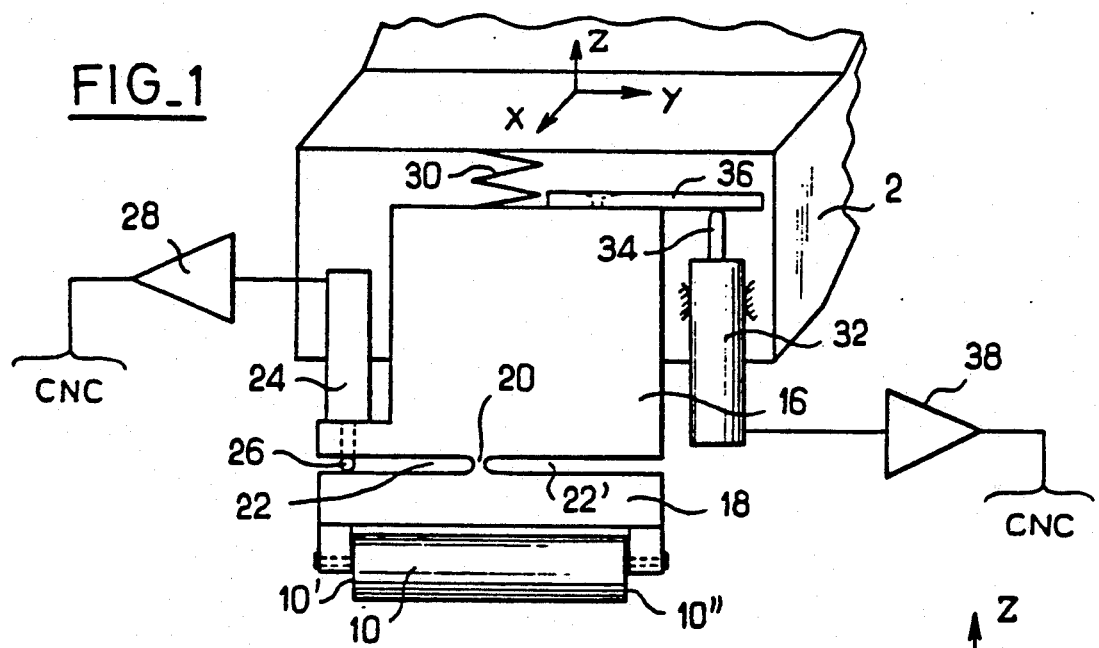
FIG_1
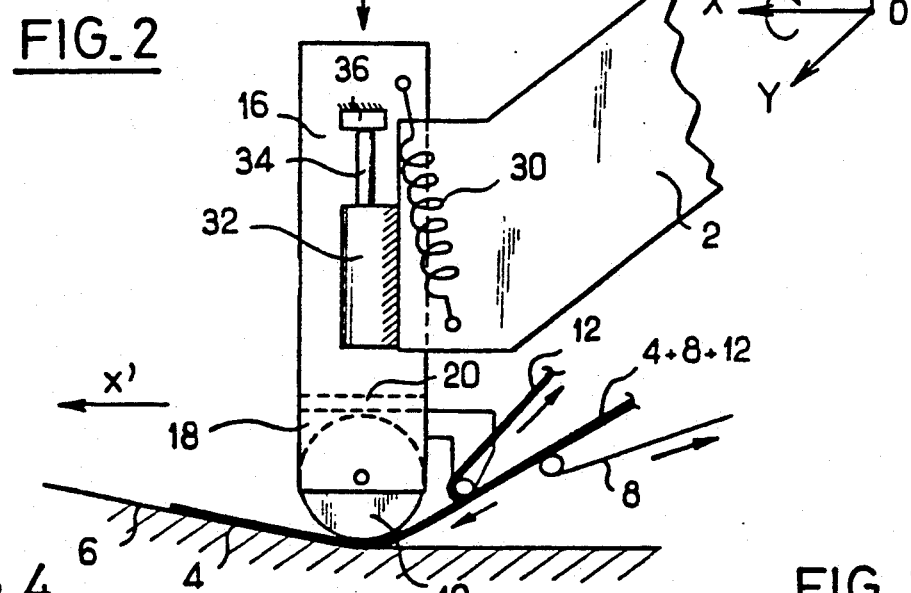
FIG_2
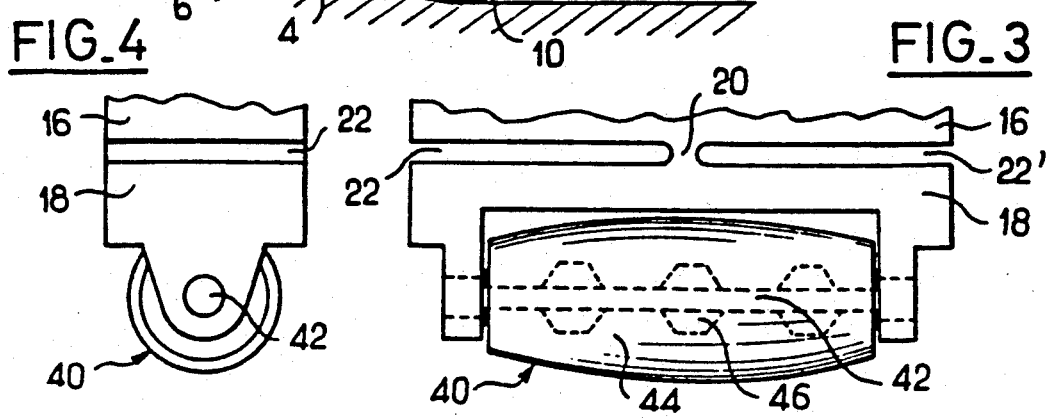
FIG_4      FIG_3

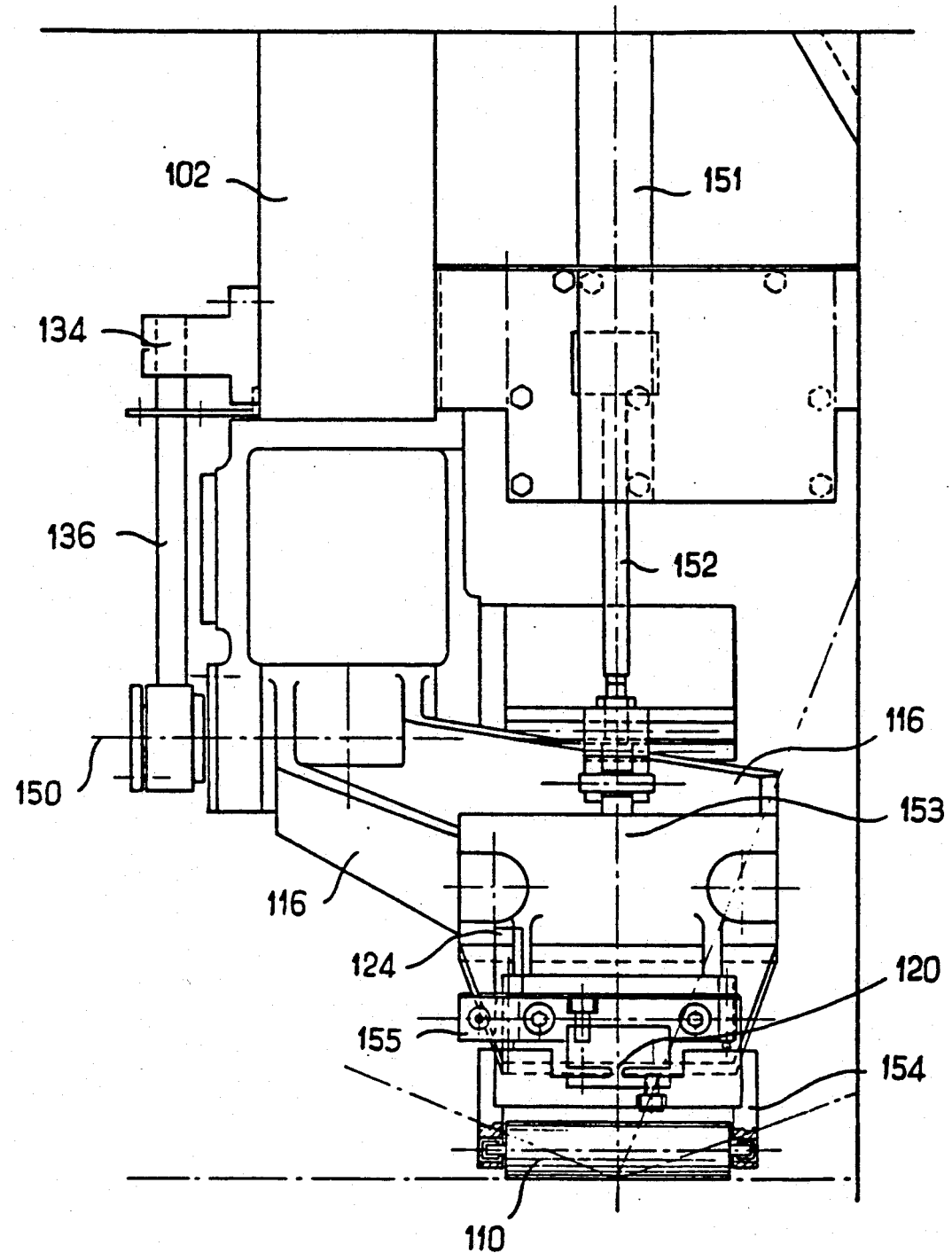
FIG_6

LAY-UP DEVICE FOR AUTOMATIC POSITIONING OF A WEB OF FIBERS ON A MOLD

BACKGROUND OF THE INVENTION

The invention relates to automatic positioning of a web of fibers on a mold for the production of various parts such as aircraft wings, means of a composite strip consisting of fiber elements which are sized (for example by impregnation with epoxy resin), pre-cut to the desired shape and dimensions, and maintained between two protective pellicles until they reach the location at which they are applied on the mold. As a rule, the top pellicle consists of a paper strip having suitable mechanical and chemical characteristics whilst the bottom pellicle consists of a very thin plastic film. The composite strip thus formed, the width of which is often within the range of 25 to 150 mm and the length of which is approximately 250 m, is provided in the form of a coil carried by an orientable part known as a "lay-up head".

The technique consists in depositing on the mold, with the highest possible degree of accuracy, the fiber elements (already cut-out and impregnated) which are conveyed in the form of the composite strip aforesaid. To this end, machines of current types are equipped with a device such as a roller or a shoe for applying the strip of fibers on the mold, the top strip of paper being recovered after it has passed beneath the application roller, the bottom protective film having been withdrawn prior to application of the fibers against the mold.

The lay-up head which supports in particular the coil of composite strip, the reels for recovery of the protective pellicles and the application device is carried by a structure which is similar to a gantry, for example, and serves to displace the lay-up head in translational motion along a longitudinal axis X (or feed-motion axis), a transverse axis Y and a vertical axis Z, as well as in rotation about the axis Z and about a horizontal axis oriented in the direction of feed motion of the machine.

The lay-up head and therefore the strip-applying device can thus be positioned and oriented, usually under the control of a numerical control unit, in order to deposit the composite strip in accordance with the profile which has been chosen.

Machines with the aforementioned lay-up head which is capable of moving along five axes are known and have been described for example in U.S. Pat. No. 3,775,219 and French patent 2,529,871.

In order to obtain good quality of stratification, it is necessary to ensure that the deposited composite strip is applied by the application device as symmetrically as possible over the entire width of the strip. For this reason, in French patent No. 2,529,871, it is proposed that the axis of rotation of the lay-up head, which is horizontal, passes through the mid-point of the line of contact of the strip with the surface to be covered.

However, this device is still subject to certain disadvantages which prevent the achievement of the desirable quality for certain applications, in particular the aircraft industry.

In fact, if the surface to be covered has been modified by the webs which have already been deposited or if said surface has not been defined with sufficient fineness, the numerical control unit is not capable of adapting the orientation of the application device to these specific conditions. In patent No. FR 2,529,871 cited earlier, steps have been taken to ensure that the means for controlling the oscillations of the lay-up head along the axis parallel to the X-axis are made dependent on detectors for sensing the proximity of the surface to be covered. However, in this case, the orientation of the entire lay-up head has to be modified. Together with all the accessories which it carries (reels, application roller, circular sector, etc.), this represents a substantial weight and inertia, thus resulting in response times which are detrimental to the quality of stratification or which make it necessary to reduce the lay-up speed.

U.S. Pat. No. 4,591,402, the teachings of which are included here by way of reference, has proposed to mount the application roller by means of an articulation. However, whether this articulation is constituted by pivot-pins or roller tracks, it appears that the position of the roller cannot be controlled with a sufficient degree of accuracy.

The present invention has for its object to overcome this disadvantage by incorporating an articulation along a horizontal axis on the support of the strip application member so that the orientation of said member is instantaneously adapted to the variations in profile which are encountered without being attended by the disadvantages of known articulations.

SUMMARY OF THE INVENTION

The present invention is directed to a lay-up device for automatic positioning of a web of fibers on a mold, which comprises a lay-up head adapted to move, under the control of a numerical control unit, in translation along three axes X, Y, Z and in rotation about the vertical axis Z as well as about a horizontal axis oriented in the direction of feed motion of the machine, said lay-up head being adapted to carry a member for applying the web of fibers to be deposited on the surface to be covered, said application member being mounted on a support which is connected to the lay-up head by means of an articulation about a horizontal axis, the articulation being interposed between an auxiliary support which carries the application member and a main support carried by the lay-up head, characterized in that the articulation is deformable without play and has very slight flexibility.

In practice, a zero-play deformable articulation of this type is advantageously constituted by a full portion reserved between two slits formed between the main support and the auxiliary support.

In accordance with the invention, the aforementioned flexible articulation has only limited freedom of flexural displacement of a few degrees (2 degrees, for example) and achieves only "adaptation" of the orientation of the application member along an axis of oscillation which may be designated as an auxiliary axis with respect to the "principal" axis of rotation of the lay-up head about the aforesaid horizontal axis, the movements of rotation about said "principal" axis being controlled by the numerical control unit in a conventional manner.

In a simple embodiment, said flexible articulation could be passive and it would simply make it possible for the application member to be self-oriented in a direction normal to the surface.

But in this case, the pressures of application of the application member on the strip of composite material are not uniformly distributed over the entire width of the strip.

In a preferred embodiment, in order to obtain this equidistribution of pressures, the flexible articulation is employed in an active form, which means that any flexural displacement of the articulation is detected by a sensor which delivers a signal. After amplification, this signal produces by means of the numerical control unit of the machine a movement of rotation of the lay-up head about the principal axis of rotation, in the direction required for the purpose of establishing a uniform distribution of pressures over the entire width of the strip.

Improved quality of stratification of the web is thus obtained.

The application member is advantageously a roller.

Advantageously, the roller has double flexibility and comprises a spindle which is capable of flexural deformation providing general flexibility, said spindle being surrounded by a volume of flexible material which is deformable in local compression.

The roller advantageously has a curved external surface which is either convex in the shape of a barrel or concave in the shape of an hourglass.

Very advantageously, the device comprises means for separating two protective strips from the strip of impregnated fibers placed upstream of the application roller.

When the movements of the lay-up head are controlled by a numerical control unit, it is an advantage to interpose a motion sensor between the auxiliary support and the main support, to ensure that the signals delivered by said sensor are transmitted to the numerical control unit after amplification by an amplifier in order to adapt the instructions contained in the numerical control unit and to displace the lay-up head in pivotal motion in the direction which cancels the flexural deformation of the flexible articulation.

Preferably, the main support is mounted so as to be capable of moving vertically on the lay-up head; springs or pneumatic jacks interposed between the main support and the lay-up head tend to exert a contact pressure of the application member on the surface to be covered; a motion sensor is interposed between the lay-up head and the main support; the signals delivered by said sensor are transmitted to the numerical control unit after amplification by an amplifier in order to lift or lower the lay-up head in a direction normal to the surface to be covered and to maintain the deflection of the main support at a predetermined value.

In a preferred embodiment, the main support is provided with arms mounted for rotation about an axis and guiding means centered on the axis are provided for guiding the composite strip which is being delivered and the protective strips on the return run.

The invention is also directed to machines for automatic shaping of a web of fibers equipped with said device. Other improvements will be described in the remainder of the description with reference to the accompanying drawings.

BRIEF DESCRIPTION OF THE DRAWINGS

FIG. 1 is a simplified front view of the lay-up device in accordance with the invention.

FIG. 2 is a partial side view of the same device.

FIGS. 3 and 4 are respectively a diametral sectional view and a side view of an application roller which can be employed on a lay-up device in accordance with the invention.

FIGS. 5 and 6 are respectively a side view and a front view of a preferred embodiment of the invention.

Figure 5:
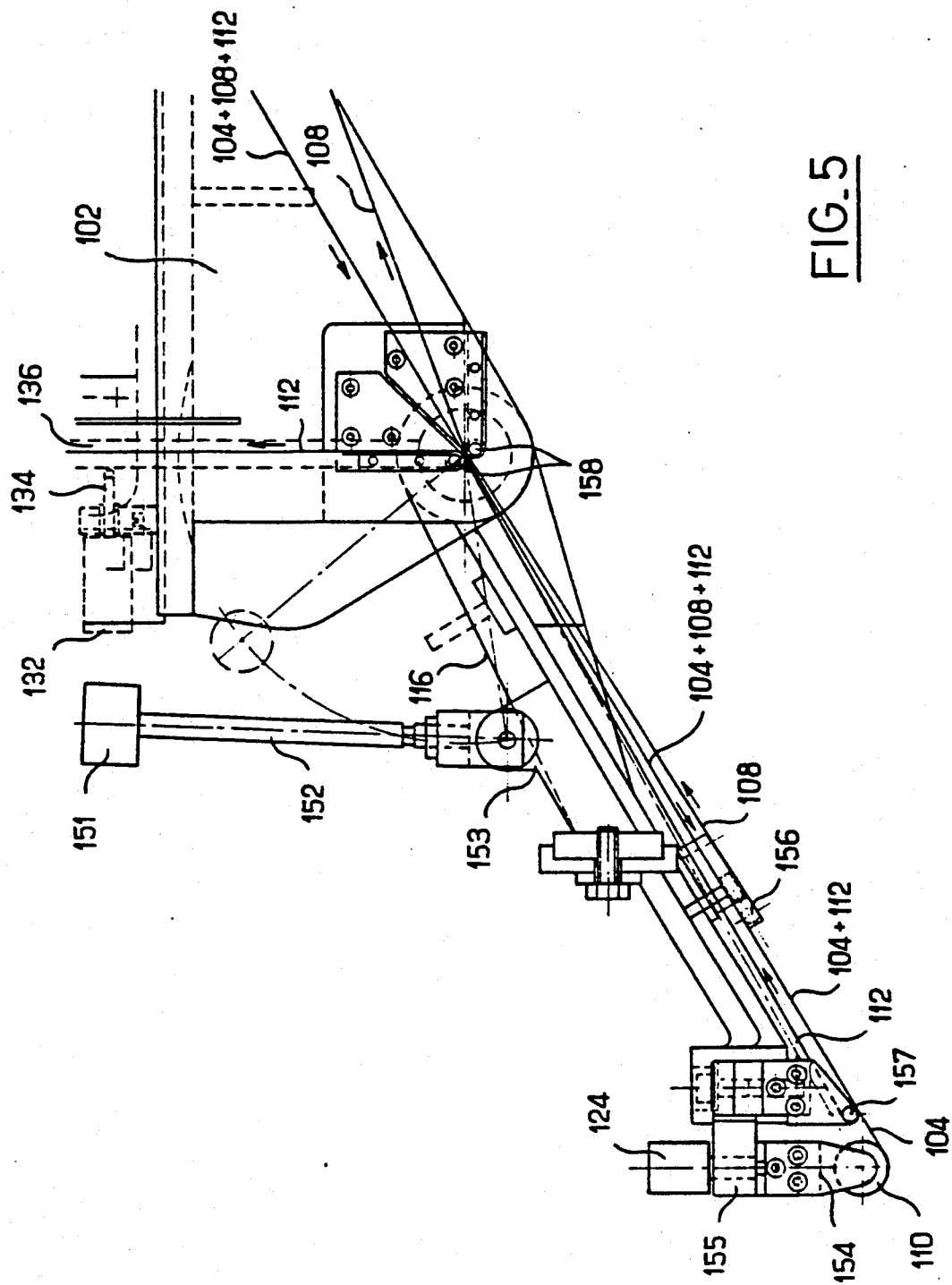

There is shown diagrammatically in FIGS. 1 and 2 a lay-up head 2 which is intended to apply a strip 4 of composite material on the surface of a mold 6, for example for the manufacture of part of an aircraft.

In known manner, the lay-up head 2 is carried by a structure (not shown) so as to undergo a displacement in translation along the three axes X, Y, Z and in rotation about the vertical axis Z and about a horizontal axis oriented in the direction of feed motion of the machine.

The displacements of the lay-up head are controlled by a numerical control unit (not shown) in such a manner as to follow the profile of the surface 6 to be covered.

The strip of composite material 4+8+12 is unwound from a feed reel (not shown), freed from a bottom protective strip 8, then freed from the top protective strip 12, then applied on the surface 6 by an application member such as a roller 10.

As shown in the drawings, and in accordance with the method described in U.S. Pat. No. 4,842,684, the top protective strip 12 (usually of paper) is separated from the composite strip immediately before passing beneath the application member (roller 10) so that only the strip of preimpregnated fibers is in contact with the roller at the point of contact with the surface to be covered. The roller 10 is preferable to an application shoe since it is capable of rotating and permitting application even if the fiber strip adheres thereto after being freed from its protective strip.

The different elements of the lay-up device are carried by a main support or carriage 16 which can be rigidly coupled to the lay-up head 2 but is preferably (as will be seen below) mounted so as to be capable of vertical displacement on the lay-up head by sliding motion in the same manner as a carriage or else by means of an articulated arm.

In accordance with the invention, the application member 10 such as a roller is carried by an auxiliary support 18 which is connected to the main support 16 by means of a flexible deformable articulation or joint 20, this articulation being flexible about a horizontal axis X' (FIG. 2) which is oriented in the direction of feed motion of the machine and located at equal distance from the edges 10'-10'' of the roller 10.

The deformable articulation 20 is only very slightly flexible (2 degrees, for example) and has only an adaptive function as will become apparent hereinafter.

The articulation 20 can be simply formed as shown in FIG. 1 by cutting two slits 22-22' between the main support 16 and the auxiliary support 18 but another form of flexible deformable articulation without play could be employed on condition that the slight flexibility is provided only about the axis X' and that the connection is without play and rigid about the other axes.

Preferably, the articulation 20 is located, in the vertical direction, as close as possible to the roller 10 or equivalent application member. By virtue of the flexibility of the articulation, the application member can normally be applied over its entire width against the surface to be covered.

A motion sensor 24 is secured to the main support 16 and its detector element 26 is in contact with the auxiliary support 18 (FIG. 1). When the lay-up pressures are not uniformly distributed from one edge of the roller 10 to the other, a very slight movement of rotation takes place by virtue of the flexible articulation 20. A displacement signal is then delivered by the sensor 24. This signal is amplified by an amplifier 28 and is sent to the numerical control unit CNC which initiates rotation of the lay-up head 2 about the horizontal axis in a direction which is suitable for restoring a uniform distribution of pressures over the entire width of the deposited strip, thus improving the quality of the lay-up.

This function of the flexible articulation is therefore an adaptive function which is superimposed on the conventional function of the numerical control unit.

In addition to the fact that it restores uniform pressure distribution, this function has an advantage in the fact that the lay-up head is brought back (by the movement of rotation described above) to a symmetrical position with respect to the auxiliary support 18. This is an important advantage since a number of elements (for example the feed reels and the receiving reels as well as the rollers for guiding the composite strip) are carried either by the main support 16 or by the head 2 itself, thus maintaining good alignment between these various elements and the application roller. This accordingly avoids "drifts" or "misalignment" of the strip which impair the quality of the lay-up.

The device in accordance with the invention preferably comprises in addition an axial automatic adaptive system for regulating the pressure of application of the composite strip.

In this case, the main support 16 is mounted, not rigidly on the lay-up head 2, but with freedom of displacement normal to the surface to be covered which is limited (see arrow 29 in FIG. 2), for example, by means of guides (not shown) in the same manner as a machine-tool carriage. One or a number of springs or pneumatic jacks 30 tend to displace the support carriage 16 downwards with respect to the lay-up head 2 and to exert a pressure of application of the roller 10 on the strip 4 to be deposited.

A motion sensor 32 is fixed on the lay-up head 2 whilst its movable member 34 is applied against a stop 36 rigidly fixed to the support carriage 16. The signal delivered by the sensor 32 is amplified by an amplifier 38 and transmitted to the numerical control unit CNC (FIG. 1) in order to be superimposed on the orders delivered by this latter and to maintain the sensor in a central position by lifting or lowering the lay-up head in a direction normal to the surface to be covered.

In a device in accordance with the invention, the function of adaptivity both in rotation and in regulation of application pressure can be selected or not by an auxiliary function of the numerical control system.

The process is as follows:

When the lay-up head 2 moves downwards, the adaptive control is selected or not by the program. If it is not selected, rotation of the head is controlled by the numerical control unit in the conventional manner. If it is selected, then in that case it is locked as long as the roller does not come into contact with the part. The movement then conforms to the items of information delivered by the numerical control unit as above. After contact, the adaptive function is released and the movement of the head is that which is controlled by the numerical control unit plus that which is controlled by the signal delivered by the sensor 24. This option makes it possible to maintain the head normal to the surface even if this latter is roughly defined or if this surface is modified by the webs which have already been deposited.

The axial adaptive function is controlled by the sensor 32 and the amplifier 38. Its operation is similar to that of the rotation control. Its action consists in lifting and lowering the head in a direction normal to the surface to be covered as a function of the signal delivered by the sensor 32 and amplified by the amplifier 38. The control conditions are the same as above.

In a lay-up device in accordance with the present invention, a roller can be employed as application member, as shown in FIGS. 1 and 2.

But preference is given to the use of an application roller 40 of the type shown in FIGS. 3 and 4, the construction of which is such that it has double flexibility, on the one hand in general flexure and on the other hand in local compression.

The roller 40 is mounted on a spindle 42 carried by the auxiliary support 18 of the lay-up head, said spindle being formed for example of steel or of composite fibers and being capable of flexural deformation in order to perform the general flexural function of the roller.

The volume 44 of the roller is of flexible material (urethane, rubber, cellular plastic, for example) which is capable of deformation in local compression. In order to increase the flexibility, empty cavities 46 can be provided within the volume 44 of the roller. Preferably, the external surface of the roller has a shape adapted to the surface to be covered, for example a barrel shape (see FIG. 3) for a concave surface or an "hourglass" shape for a convex surface.

By virtue of this double flexibility in general flexure and in local compression, associated with the general shape of the roller, it is possible to obtain a constant contact pressure on a plane or on a given curvature of the surface to be covered.

The general flexibility of a roller thus formed is such that the local pressure on the fibers is low, thus eliminating the "wave" effect often encountered with the application rollers employed up to the present time and makes it possible to obtain, in combination with the adaptive system described in the foregoing, stratified structures of high quality, especially for the aircraft industry.

A preferred embodiment of the invention has been shown in FIGS. 5 and 6.

The application roller 110 is mounted on the head 102 by means of two roller-supporting application arms 116. These arms 116 are pivoted about an axis 150 and are controlled by a pneumatic jack 151, the body of which is pivotally coupled to the head 102 and the operating rod 152 of which is pivotally mounted on a plate 153 which provides a connection between the two arms.

The roller 110 is rotatably mounted in the arms of a yoke 154 and this latter is joined by means of the deformable articulation 120 to the support 155 which is rigidly fixed to the arms 116. The deformable articulation permits a very slight inclination of the order of 1/10 mm in 50 mm.

The sensor 124 serves to measure the displacement or, better still, the forces exerted on the roller 110.

As is clearly apparent from FIG. 5, the strip of fibers with its two pellicles 104+108+112 is brought into position beneath the application arms 116. A roller 156 which is rigidly fixed to the arms or to the plate 153 serves to remove the protective film 108.

The assembly 104+112 continues up to a second roller 157 which is located immediately upstream of the application roller 110 and makes it possible to extract the paper 112, thus allowing only the bare strip 104 of preimpregnated fibers to pass over the roller 110.

At the level of the axis 150 of the application arms, guide rollers 158 grip on the one hand the assembly 104+108+112 which is being delivered and on the other hand the strips 108 and 112 on the return run so as to guarantee constancy of the lengths of the strip irrespective of the deflection of the application arms 116.

The displacement normal to the surface of application of the arm or the force of application of the arm is measured by means of a motion sensor 132, the rod 134 of said sensor being applied on a bar 136 which is rotationally coupled to the arms 116.

The operation of sensors 136 and 124 is similar to the operation already explained with reference to FIGS. 1 and 2.

In particular, the numerical control unit is intended to store in memory and to compute the three geometrical coordinates of each point of the surface and also the three geometrical components of the vector normal to the surface at said point so as to be capable of controlling the movement of disengagement of the application roller in a direction normal to the surface, thus avoiding unintentional driving by friction of the applied strip and therefore positioning errors.

We claim:

1. Lay-up device for automatic positioning of a web of fibers on a mold, which comprises a lay-up head adapted to move under control of a numerical control unit, in translation along three axes X, Y, and Z and in rotation about a vertical axis Z as well as about a horizontal axis X' oriented in a direction of feed motion of a machine, said lay-up head being adapted to carry an application member for applying the web of fibers to be deposited on a surface to be covered, said application member being mounted on an auxiliary support which is connected to a main support of the lay-up head by means of a joint about the horizontal axis of rotation X' which extends substantially in the direction of feed motion of the machine, the joint being formed between two slits formed between the main support and the auxiliary support, said joint being deformable and very slightly flexible.

2. The device of claim 1 wherein the joint is located equidistant from two edges of the application member.

3. The device of claim 1 wherein the application member is a roller.

4. The device of claim 3 wherein the roller has double flexibility and comprises a spindle which is capable of flexural deformation and provides flexibility, said spindle being surrounded by a volume of flexible material which is deformable in local compression.

5. The device of claim 4 wherein the roller has a curved external surface.

6. The device of claim 1 which comprises means for separating two protective strips from a strip of impregnated fibers upstream of the application roller.

7. The device of claim 1 further comprising a first motion sensor interposed between the auxiliary support and the main support for delivering a signal, an amplifier for amplifying the signal, means for transmitting the amplified signal to the numerical control unit to adapt instructions contained in the numerical control unit and to displace the lay-up head in pivotal motion in a direction which cancels flexural deformation of the joint.

8. The device of claim 7, wherein the main support is mounted so as to be capable of moving vertically on the lay-up head, said device further comprising spring means interposed between the main support and the lay-up head for exerting a contact pressure of the application member on the surface to be covered, a second motion sensor interposed between the lay-up head and the main support, whereby the signal delivered by the second sensor is transmitted to the numerical control unit after amplification by the amplifier in order to lift or lower the lay-up head in a direction normal to the surface to be covered and to maintain deflection of the main support at a predetermined value.

9. The device of claim 8 wherein the main support comprises arms mounted for rotation about an axis and guiding means centered on the axis for guiding a composite strip which is being delivered and protective strips on a return run.

* * * * *